United States Patent
Ito et al.

(10) Patent No.: US 6,250,692 B1
(45) Date of Patent: Jun. 26, 2001

(54) QUICK CONNECTOR ASSEMBLY, AND FEMALE MEMBER OF QUICK CONNECTOR ASSEMBLY

(75) Inventors: Tomohide Ito, Kasugai; Akira Takayanagi, Aichi-ken, both of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/347,039

(22) Filed: Jul. 2, 1999

(30) Foreign Application Priority Data

| Jul. 9, 1998 | (JP) | ............................................. 10-193869 |
| Jun. 2, 1999 | (JP) | ............................................. 11-155405 |

(51) Int. Cl.⁷ ............................ F16L 17/00; F16L 19/00; F16L 39/00
(52) U.S. Cl. ............................ 285/319; 285/351; 285/921
(58) Field of Search .................... 285/319, 351, 285/921, 352

(56) References Cited

U.S. PATENT DOCUMENTS

| 4,601,497 | 7/1986 | Bartholomew . |
| 4,846,506 | 7/1989 | Bocson et al. . |
| 4,948,175 | 8/1990 | Bartholomew . |
| 5,002,315 | 3/1991 | Bartholomew . |
| 5,067,754 | 11/1991 | Bartholomew . |
| 5,161,833 | 11/1992 | McNaughton et al. . |
| 5,374,088 | 12/1994 | Moretti et al. . |
| 5,441,313 | * 8/1995 | Kalahasthy ................ 285/319 X |
| 5,499,848 | * 3/1996 | Kujawski ................... 285/319 X |
| 5,511,827 | * 4/1996 | Steinkamp et al. ......... 285/319 X |
| 5,785,358 | * 7/1998 | Kujawski et al. .......... 285/319 X |

FOREIGN PATENT DOCUMENTS

| 2 705 430 | 11/1994 | (FR) . |
| 6-31668 | 4/1994 | (JP) . |
| 7-293771 | 11/1995 | (JP) . |
| 8-233181 | 9/1996 | (JP) . |

* cited by examiner

*Primary Examiner*—Neill Wilson
(74) *Attorney, Agent, or Firm*—Burr & Brown (57) ABSTRACT

A female member for use with a male member of a quick connector assembly, including a first tubular portion which has a first axial bore having a first diameter, a second tubular portion which is coaxial with the first tubular portion and which has a second axial bore which has a second diameter greater than the first diameter of the first axial bore, which is adapted to hold one or more annular seal members and which cooperates with the first axial bore to receive an end portion of the male member, and a connecting portion which connects between the first and second tubular portions and which has an annular recess which opens in the second axial bore, which is located radially outwardly of the first axial bore and which prevents the annular seal member or members from being moved from the second axial bore into the first axial bore when the end portion of the male member is inserted into the female member.

21 Claims, 6 Drawing Sheets

QUICK CONNECTOR ASSEMBLY, AND FEMALE MEMBER OF QUICK CONNECTOR ASSEMBLY

BACKGROUND OF THE INVENTION

1. Field of the Invention

The present invention relates to a quick connector assembly which is used to connect two pipes of a piping system of, for example, an automotive vehicle in which a fluid such as gasoline, oil, water, or air flows.

2. Related Art Statement

Figure 7:
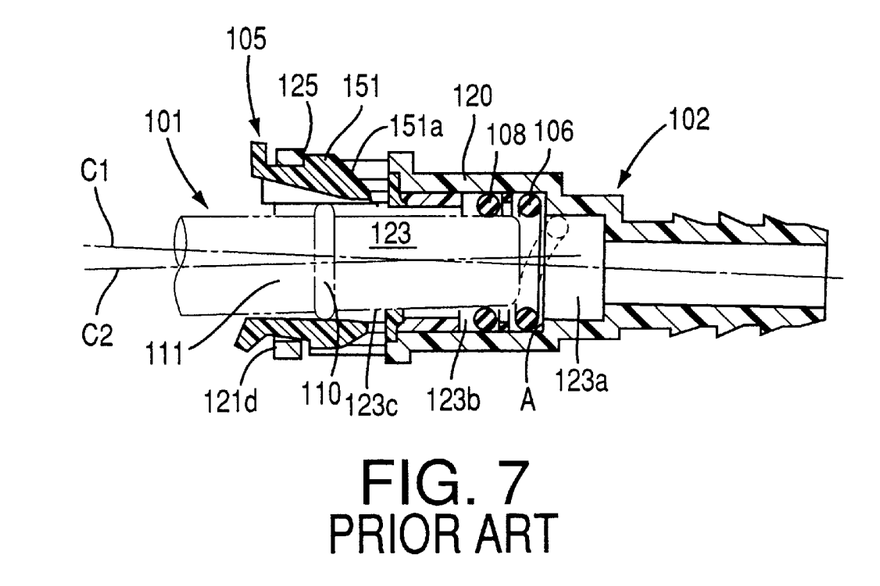
FIG. 7 is a cross-sectioned, front elevation view of a conventional quick connector assembly.

FIG. 7 shows a known quick connector assembly which is disclosed in, U.S. Pat. No. 5,374,088, U.S. Pat. No. 5,161,833, U.S. Pat. No. 5,067,754, U.S. Pat. No. 5,002,315, U.S. Pat. No. 4,948,175, U.S. Pat. No. 4,846,506, U.S. Pat. No. 4,601,497, and FR 2,705,430 A1, JP (TOKU-KAI) 8-233181, JP (TOKU-KAI) 7-293771, JP (TOKU-KO) 6-31668. The known connector assembly includes a male member 101 having an end portion 111 with an annular projection 110; and a female member 102 into which the end portion 111 of the male member 101 is fluid-tightly inserted so that two pipes of a piping system are fluid-tightly connected to each other.

The female member 102 is provided by a generally tubular member 120 which has an axial bore 123 into which the end portion 111 of the male member 101 is inserted. The axial bore 123 extends axially inwardly from an inlet 121d, and includes a third axial portion 123c, a second axial portion 123b, and a first axial portion 123a in the order of description. The second axial portion 123b has a diameter greater than a diameter of the first axial portion 123a and is smaller than a dimension of the third axial portion 123c. The female member 102 has, in relation with the axial hole 123c, a pair of engageable surfaces 125, 125 which extend radially from an axis of the female member 102 and which are engageable with a retainer member 105 to hold the same 105 in the axial hole 123c. In a state in which the retainer member 105 is held in the axial hole 123c, the end portion 111 of the male member 101 is inserted into the female member 102 through the inlet 121d, while the annular projection 110 of the end portion 111 elastically deforms a pair of opposed portions 151a of a stopper portion 151 of the retainer member 105 and snaps in a pair of engageable holes of the retainer member 105. Thus, the retainer member 105 prevents the male member 101 from disassembling from the female member 102. Two annular seal members 106, 108 are fluid-tightly fitted in an inner cylindrical wall surface of the female member 102 that defines the second axial bore 123b. Since the diameter of the first axial bore 123a is smaller than that of the second axial bore 123b, the female member 102 has an annular surface, A, which is located between the first and second axial bores 123a, 123b and which extend radially from the axis of the female member 102. A free end of the end portion 111 of the male member 101 is tightly fitted in the first axial bore 123a and the two annular seal members 106, 108 provided in the second axial bore 123b.

However, the annular surface A of the female member 102 that is provided between the first and second axial bores 123a, 123b extends on a plane perpendicular to the axis of the female member 102 or the tubular member 120. On the other hand, the two elastically deformable opposed portions 151a of the stopper member 150 that are inclined toward the axis of the tubular member 120, are considerably largely deformed if the end portion 111 of the male member 101 is inserted through the inlet 121d in such a manner that an axis, C2, of the male member 101 is considerably largely inclined relative to an axis, C1, of the female member 102. In addition, the quick connector assembly has some play between the male member 101 and the female member 102, for the purpose of allowing the male member 101 to be smoothly inserted into the female member 102. Accordingly, when the end portion 111 of the male member 101 is inserted in the female member 102 such that the axis C2 of the male member 101 is largely inclined relative to the axis C1 of the female member 102, as shown in FIG. 7, or such that the axis C2 is not aligned with the axis C1, the free end of the male member 101 partially or locally pushes the annular seal member 106 provided in the second axial bore 123b, so that the seal member 106 may be forcedly moved into the first axial bore 123a, as indicated at broken line. In this case, the prior connector assembly suffers from a serious problem that the seal member 106 can no longer fluid-tightly seal between the male member 101 and the female member 102.

SUMMARY OF THE INVENTION

It is therefore an object of the present invention to provide a female member which is used with a male member of a quick connector assembly and which is free from the above-indicated problem.

It is another object of the present invention to provide a quick connector assembly which is free from the above-indicated problem.

(1) According to a first feature of the present invention, there is provided a female member for use with a male member of a quick connector assembly, comprising a first tubular portion which has a first axial bore having a first diameter; a second tubular portion which is coaxial with the first tubular portion and which has a second axial bore which has a second diameter greater than the first diameter of the first axial bore, which is adapted to hold at least one annular seal member and which cooperates with the first axial bore to receive an end portion of the male member; and a connecting portion which connects between the first and second tubular portions and which has an annular recess which opens in the second axial bore, which is located radially outwardly of the first axial bore and which prevents the annular seal member from being moved from the second axial bore into the first axial bore when the end portion of the male member is inserted into the female member. The present female member has the annular recess which is recessed from a reference plane perpendicular to a common axis of the first and second tubular portions, which opens in the second axial bore and which is located radially outwardly of the first axial bore. When the end portion of the male member is inserted into the female member, an axis of the end portion of the male member may be inclined relative to an axis of the female member, or may be misaligned with the axis of the female member. In those cases, the annular seal member may be locally or partly pushed by the free end of the end portion of the male member when the end portion of the male member is inserted into the female member. In the present female member, however, the pushed portion of the seal member is received or supported by the annular recess and is prevented from being moved into the first axial bore. Accordingly, the male member can be fluid-tightly connected to the female member with reliability.

(2) According to a second feature of the present invention that includes the first feature (1), the connecting portion has (a) a tapered annular surface whose diameter decreases in an axial direction from the first axial bore toward the second axial bore, whose smallest diameter is not smaller than the first diameter of the first axial bore, and whose greatest diameter is not greater than the second diameter of the second axial bore, and (b) a first cylindrical surface which is continuous, in the axial direction, with a second cylindrical surface of the second tubular portion that defines the second axial bore, and the annular recess is at least partly defined by the tapered annular surface and the first cylindrical surface. The annular recess may be defined by only the tapered annular surface and the first cylindrical surface, or may be defined by those two surfaces and an annular bottom surface parallel to the above-indicated reference plane. The angle of tapering of the tapered annular surface may range from 45 degrees to 80 degrees with respect to the axial direction.

(3) According to a third feature of the present invention that includes the first feature (1), the annular recess comprises an annular groove which has a predetermined depth, whose inner diameter is greater than the first diameter of the first axial bore, and whose outer diameter is not greater than the second diameter of the second axial bore. The outer diameter of the annular groove may be equal to, or smaller than, the second diameter of the second axial bore. In the former case, the annular groove is partly defined by the above-indicated first cylindrical surface which is continuous, in the axial direction, with the second cylindrical surface of the second tubular portion that defines the second axial bore.

(4) According to a fourth feature of the present invention that includes any one of the first to third features (1) to (3), the female member further comprises a third tubular portion which is coaxial with the first and second tubular portions and which has an axial hole which has a dimension greater than the second diameter of the second axial bore, which is adapted to hold a retainer member and which cooperates with the first and second axial bores to receive the end portion of the male member and cooperates with the retainer member to prevent the male member from disassembling from the female member. The axial hole may have a circular transverse cross section but is by no means limited to the same. The axial hole may have a polygonal cross section such as a quadrangular cross section, depending upon the shape of the retainer member. In the latter case, the dimension of the axial hole may be defined as the diameter of a circle which internally contacts the polygonal cross section. In each case, the present female member has a step between the second and third tubular portion.

(5) According to a fifth feature of the present invention that includes the fourth feature (4), the female member comprises a single tubular member which is integrally formed to include the first, second and third tubular portions and the connecting portion, and the first axial bore of the first tubular portion is connected to a fluid passage through which a fluid flows.

(6) According to a sixth feature of the present invention that includes the fourth or fifth feature (4) or (5), the third tubular portion has at least one engageable surface which extends in a radial direction with respect to a common axis of the first, second and third tubular portions and which is engageable with the retainer member to prevent the retainer member from disassembling from the female member.

(7) According to a seventh feature of the present invention that includes the sixth feature (6), the third tubular portion has two holes which are opposite to each other with respect to the common axis and each of which is formed through a thickness of the third tubular portion in the radial direction, the third tubular portion having, as the at least one engageable surface, two engageable surfaces which partly define the two holes, respectively.

(8) According to an eighth feature of the present invention that includes the sixth feature (6), the third tubular portion has a radially inner annular flange which extends radially inwardly from an axial end of the third tubular portion that defines an inlet through which the end portion of the male member is inserted into the female member, the at least one engageable surface comprising at least one portion of an axially inner annular surface of the radially inner annular flange.

(9) According to a ninth feature of the present invention that includes any one of the first to eighth features (1) to (8), the female member further comprises an annular bushing which is provided in the second axial bore, which cooperates with the annular recess to hold the annular seal member and which stops, at a predetermined position, the insertion of the male member into the female member. However, the annular bushing may be omitted. In the latter case, the retainer member may be used to hold the seal member in the second axial bore.

(10) According to a tenth feature of the present invention that includes any one of the first to ninth features (1) to (9), the female member further comprises two annular seal members which are provided side by side in the second axial bore.

(11) According to an eleventh feature of the present invention, there is provided a quick connector assembly for connecting between two pipes of a piping system, comprising a female member; a retainer member; a male member having a tubular shape and including an end portion which is insertable into, and is disassembleable from, the female member and which includes a first axial portion which has a free axial end of the male member and has a first outer diameter, a second axial portion which is coaxial with the first axial portion, has a second outer diameter greater than the first outer diameter, and is engageable with the retainer member, and a third axial portion which is coaxial with the first and second axial portions and has a third outer diameter smaller than the second outer diameter; and at least one annular seal member which is engageable with the first axial portion of the end portion of the male member to seal fluid-tightly between the end portion of the male member and the female member, the female member including a first tubular portion which has a first axial bore having a fourth diameter; a second tubular portion which is coaxial with the first tubular portion and which has a second axial bore which has a fifth diameter greater than the fourth diameter of the first axial bore, which is adapted to hold the annular seal member and which cooperates with the first axial bore to receive the end portion of the male member; and a connecting portion which connects between the first and second tubular portions and which has an annular recess which opens in the second axial bore, which is located radially outwardly of the first axial bore and which prevents the annular seal member from being moved from the second axial bore into the first axial bore when the end portion of the male member is inserted into the female member. The present quick connector assembly enjoys the same advantages as those of the female member in accordance with the first feature (1).

(12) According to a twelfth feature of the present invention that includes the eleventh feature (11), the connecting portion of the female member has (a) a tapered annular surface whose diameter decreases in an axial direction from the first axial bore toward the second axial bore, whose smallest diameter is not smaller than the first diameter of the first axial bore, and whose greatest diameter is not greater than the second diameter of the second axial bore, and (b) a first cylindrical surface which is continuous, in the axial direction, with a second cylindrical surface of the second tubular portion that defines the second axial bore, and the annular recess is at least partly defined by the tapered annular surface and the first cylindrical surface.

(13) According to a thirteenth feature of the present invention that includes the eleventh feature (11), the annular recess of the female member comprises an annular groove which has a predetermined depth, whose inner diameter is greater than the first diameter of the first axial bore, and whose outer diameter is not greater than the second diameter of the second axial bore.

(14) According to a fourteenth feature of the present invention that includes any one of the eleventh to thirteenth features (11) to (13), the female member further comprises a third tubular portion which is coaxial with the first and second tubular portions and which has an axial hole which has a dimension greater than the fifth diameter of the second axial bore, which is adapted to hold the retainer member and which cooperates with the first and second axial bores to receive the end portion of the male member and cooperates with the retainer member to prevent the male member from disassembling from the female member.

(15) According to a fifteenth feature of the present invention that includes the fourteenth feature (14), the third tubular portion has at least one first engageable surface which extends in a radial direction with respect to a common axis of the first, second, and third tubular portions and which is engageable with the retainer member to prevent the retainer member from disassembling from the female member.

(16) According to a sixteenth feature of the present invention that includes the fifteenth feature (15), the retainer member has a central space into which the end portion of the male member is insertable; at least one elastically deformable portion which has at least one engageable recess and which is elastically deformable to allow at least one portion of the second axial portion of the end portion to snap in the at least one engageable recess so that the male member is held by the retainer member; and at least one second engageable surface which is engageable with the at least one first engageable surface of the third tubular portion of the female member so that the retainer member is held by the female member.

(17) According to a seventeenth feature of the present invention that includes the fifteenth or sixteenth feature (15) or (16), the third tubular portion of the female member has two holes which are opposite to each other with respect to the common axis and each of which is formed through a thickness of the third tubular portion in the radial direction, the third tubular portion having, as the at least one first engageable surface, two first engageable surfaces which define the two holes, respectively.

(18) According to an eighteenth feature of the present invention that includes any one of the eleventh to seventeenth features (11) to (17), the first axial bore of the female member is connected to a fluid passage of one of the two pipes through which a fluid flows.

(19) According to a nineteenth feature of the present invention that includes any one of the eleventh to eighteenth features (11) to (18), the quick connector assembly further comprises an annular bushing which is provided in the second axial bore and which cooperates with the annular recess to hold the annular seal member.

(20) According to a twentieth feature of the present invention that includes any one of the eleventh to nineteenth features (11) to (19), the retainer member has at least one engageable recess which is engageable with at least one portion of the second axial portion of the end portion of the male member to hold the male member. In the state in which the engageable recess of the retainer member is engaged with the second axial portion (e.g., annular projection) of the end portion of the male member, the male member cannot be moved relative to the retainer member in an axial direction of the male member. The operator can push and insert the end portion of the male member held by the retainer member, into the axial hole of the female member through an inlet thereof, so that the retainer member is held by the axial hole of the female member and simultaneously the retainer member cooperates with the second axial portion of the male member to connect the male member to the female member. In addition, the male member can be disassembled together with the retainer member, from the female member, by, e.g., elastically deforming the retainer member in the axial bore of the female member.

(21) According to a twenty-first feature of the present invention that includes the twentieth feature (20), the at least one engageable recess comprises at least one selected from at least one hole and at least one groove.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described a quick connector assembly to which the present invention is applied, by reference to FIGS. 1 to 4. The quick connector assembly is used to connect two pipes (not shown) of a piping system.

Figure 1:
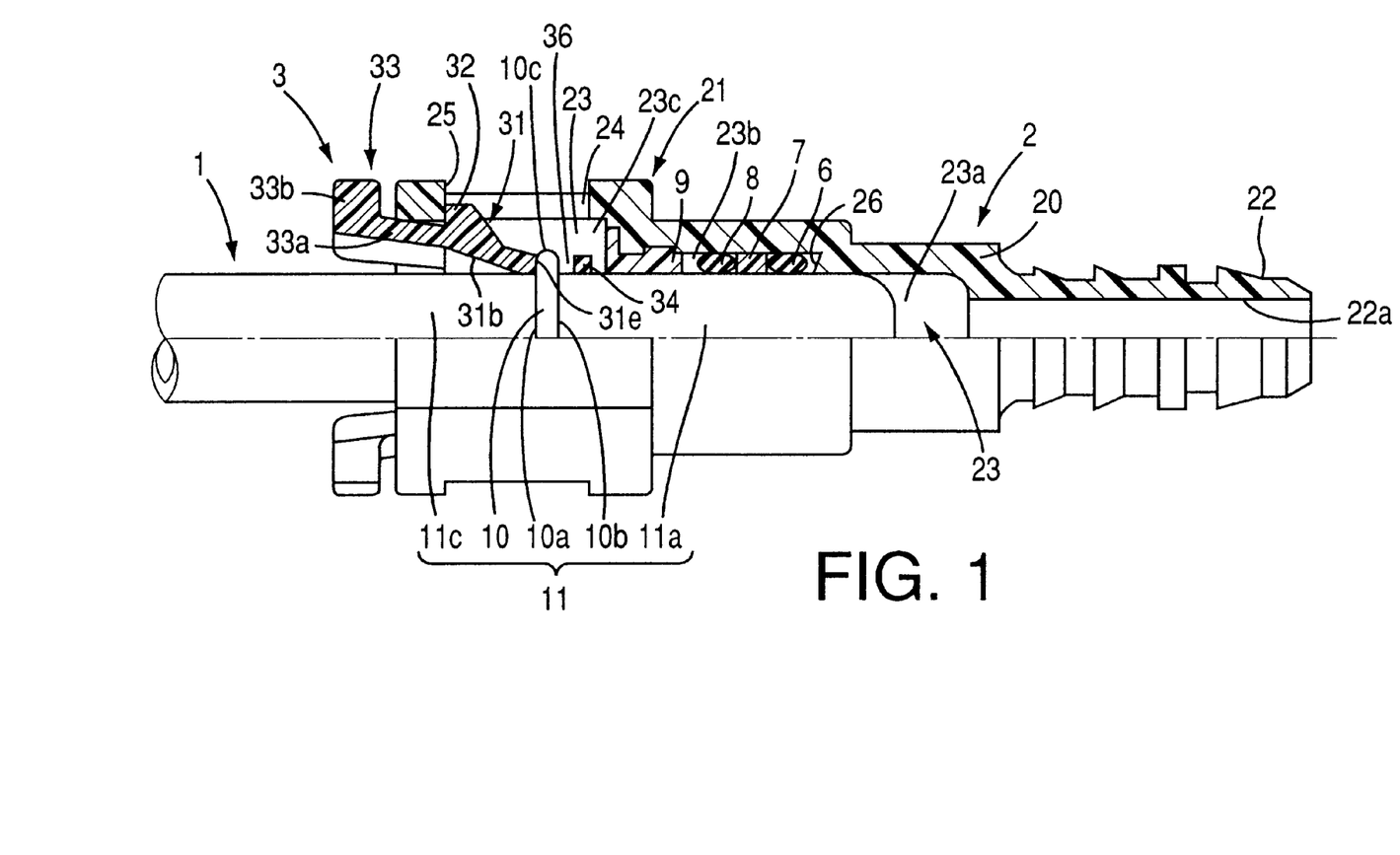
FIG. 1 is a partly cross-sectioned, front elevation view of a quick connector assembly as a first embodiment of the present invention.

The present connector assembly includes a generally tubular male member 1; a generally tubular female member 2; a retainer member 3 which can be held by the female member 2 and which can hold the male member 1 inserted in the female member 2; and two annular seal members 6, 8 which are provided side by side in the female member 2 so as to seal fluid-tightly between the female member 2 and the male member 1 inserted in the female member 2.

The male member 1 is provided by a generally tubular conduit which is formed of a metal or a resin. As shown in FIG. 1, the male member 1 includes an end portion 11 which can be inserted in the female member 2 so as to connect the male member 1 to the female member 2.

More specifically described, the end portion 11 of the male member 1 includes a first cylindrical axial portion 11a including a free axial end of the male member 1; a second axial portion in the form of an annular projection 10 radially outwardly projecting from the remaining cylindrical portion of the end portion 11; and a third cylindrical axial portion 11c which is coaxial with the first axial portion 11a and the annular projection 10 and which is opposite to the first axial portion 11a with respect to the annular projection 10 in an axial direction of the end portion 11. The end portion 11 of the male member 1 has a considerably smooth outer surface, so as to be smoothly inserted in the female member 2.

Figure 2A:
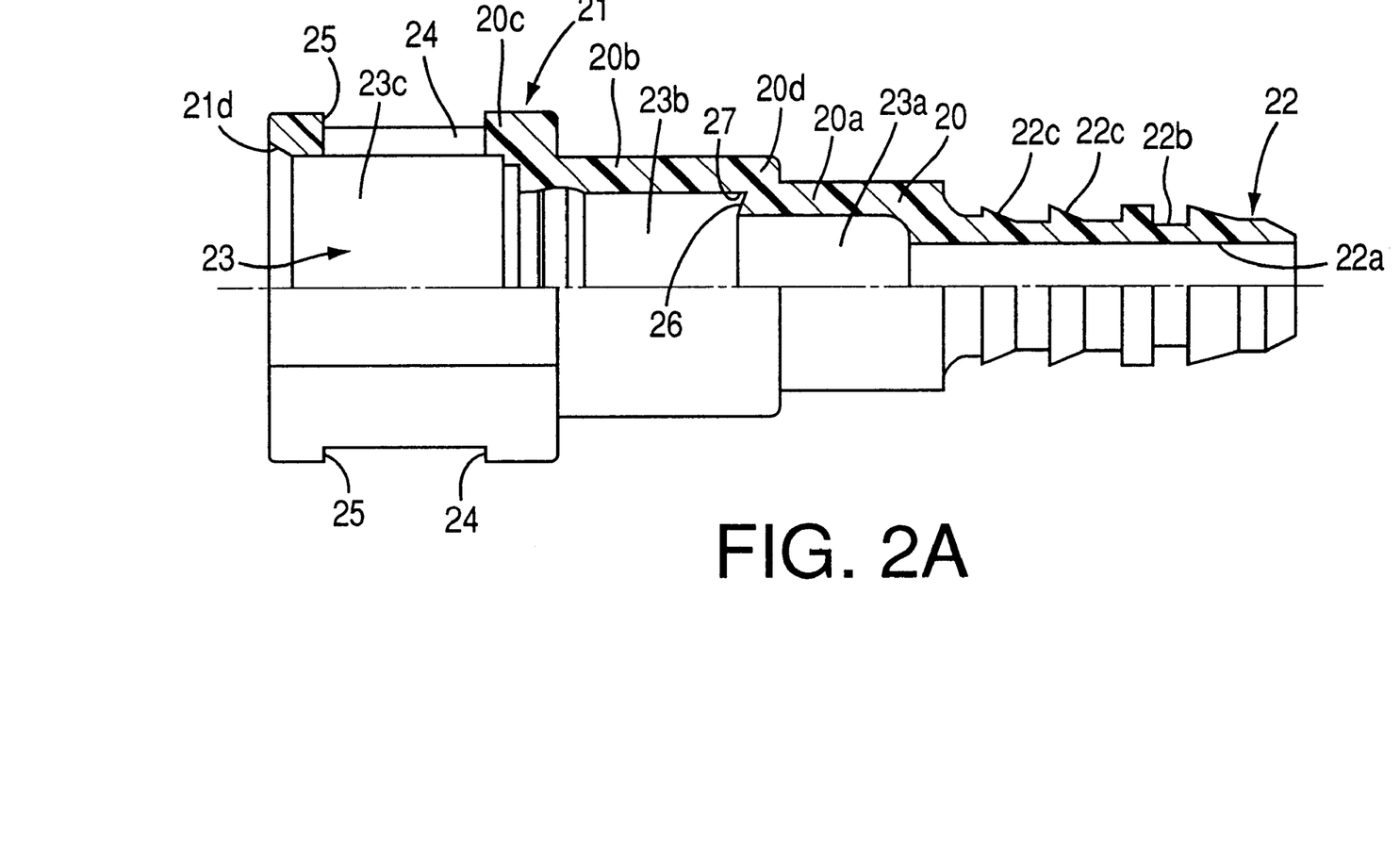
FIG. 2A is a partly cross-sectioned, front elevation view of a female member of the connector assembly of FIG. 1.

The female member or housing 2 is provided by a generally tubular hollow body 20 which is integrally formed, by molding, of a resin, such as nylon, so as to have a generally tubular wall. As shown in FIGS. 1 and 2A, the female member 2 has, in one half portion 21 thereof, an axial bore 23 suitable for receiving the end portion 11 of the male member 1, and has, in the other half portion 22 thereof, a connection passage 22a which is connected to a fluid passage of a hose as one of the two pipes of the piping system. A fluid flows through the male and female members 1, 2 of the present quick connector assembly and the two pipes of the piping system.

The axial bore 23 is concentric with the first half portion 21 of the tubular body 20, and includes a first cylindrical axial portion 23a which is defined by a first tubular portion 20a of the tubular body 20, is continuous with the connection passage 22a of the second half portion 22, and is suitable for receiving the end portion 11 of the male member 1; a second cylindrical axial portion 23b which is defined by a second tubular portion 20b of the tubular body 20, is coaxial and continuous with the first axial portion 23a, has a diameter greater than the diameter of the first axial portion 23a, and fluid-tightly holds the two annular seal members 6, 8 fitted therein; and a generally cylindrical axial portion 23c which is defined by a third tubular portion 20c of the tubular body 20, is coaxial and continuous with the second axial portion 23b, and has a dimension greater than the diameter of the second axial portion 23b. The tubular body 20 additionally includes a cylindrical connecting portion 20d which connects between the first and second tubular portions 20a, 20b and which has a full-circular or annular recess 27 which opens in the second axial bore 23b. That is, the annular recess 27 is formed in an annular stepped portion between the first and second tubular portions 20a, 20b, so as to open in the second axial bore 23b.

The female member 2 has, in relation with the axial hole 23c, a pair of first engageable surfaces 25, 25 which are engageable with the retainer member 3 so as to connect stably the male member 1 held by the retainer member 3, to the female member 2, and prevent the male member 1 from disassembling from the female member 2.

More specifically described, the female member 2 has a pair of generally rectangular openings or holes 24, 24 which are symmetric with each other with respect to an axis (i.e., center line) of the tubular body 20 and which are formed through the thickness of the tubular wall of the same 20 in a radial direction with respect to the axis so as to open in the axial hole 23c and in an outside space of the tubular body 20. The two first engageable surfaces 25 partly define the two rectangular holes 24, respectively. Each of the two holes 24 is partly defined by two wall surfaces which are opposed to each other in an axial direction of the tubular body 20, and one of the two opposed surfaces that is nearer to an inlet 21d of the female member 2 provides a corresponding one of the two first engageable surfaces 25. Thus, the two first engageable surfaces 25 extend in the radial direction of the tubular body 20.

In the second tubular portion 20b of the tubular body 20 that defines the second axial bore 23b, the first annular seal member 6, a short cylindrical collar member 7, the second annular seal member 8 (e.g., an O-ring), and an annular bushing 9 are fluid-tightly fitted in the order of description in a direction from the side of the first axial bore 23a toward the side of the axial hole 23c. The annular bushing 9 cooperates with the annular recess 27 of the cylindrical connecting portion 20d, to hold the two annular seal members 6, 8 and the collar member 7 in the second axial bore 23b.

The annular bushing 9 has an outer flange extending from one axial end portion thereof, and the other axial end portion of the annular bushing 9 is press-fitted in the second axial bore 23b. Thus, the annular bushing 9 is fixed at a predetermined position, and stably holds the two annular seal members 6, 8 in the second axial bore 23b.

In an alternative manner, however, the annular bushing 9 may be omitted. In this case, the retainer member 3 may directly contact the second annular seal member 8, thereby holding the two annular seal members 6, 8 in the second axial bore 23b.

The diameter of the second axial bore 23b is greater than that of the first axial bore 23a, and an annular surface 26 is formed between the first and second axial bores 23a, 23b so as to extend radially with respect to the axis of the tubular body 20. The annular surface 26 is tapered such that the diameter of the annular surface 26 decreases in an axial direction from the first axial bore 23a toward the second axial bore 23b, and cooperates with a cylindrical wall surface coaxial and continuous with an inner cylindrical wall surface of the second tubular portion 20b that defines the second axial bore 23b, to define the full-circular or annular recess 27 which opens in the second axial bore 23b and which is located radially outwardly of the first axial bore 23a. The angle of tapering of the annular surface 26 with respect to the above axial direction ranges from 45 degrees to 80 degrees. Even if the male member 1 may be inserted in, and connected to, the female member 2 such that an axis of the male member 1 is not aligned with, or is inclined relative to, the axis of the female member 2, the annular recess 27 or the tapered annular surface 26 prevents the first annular seal member 6 from being moved, by the end portion 11 of the male member 1, from the second axial bore 23b into the first axial bore 23a, because the annular seal member 6 is received or supported by the annular recess 27.

Figure 3:
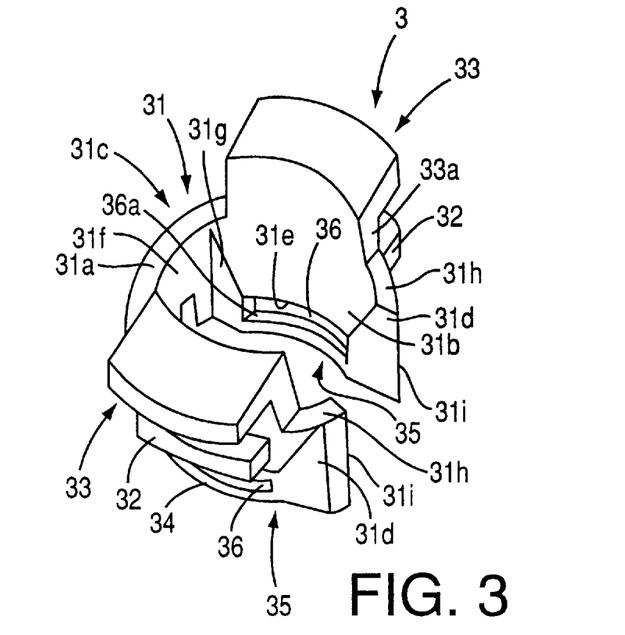
FIG. 3 is a perspective view of a retainer member of the connector assembly of FIG. 1.
Figure 4:
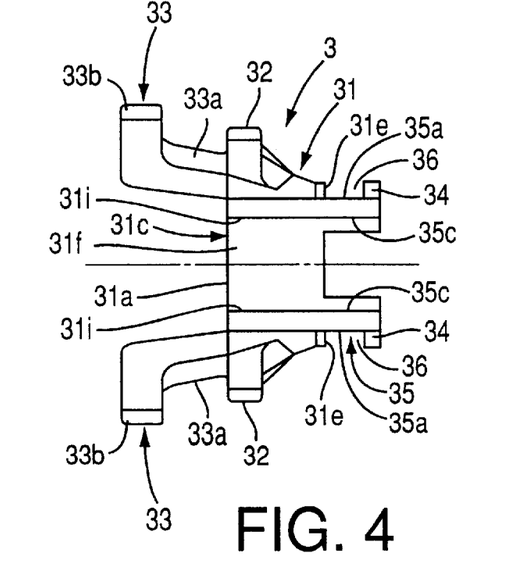
FIG. 4 is a front elevation view of the retainer member of FIG. 3.

The retainer member 3 is formed of a resin so as to have a generally C-shaped cross section and have a considerably small wall thickness. As shown in FIGS. 3 and 4, the retainer member 3 has a central space into which the end portion 11 of the male member 1 can be inserted. The retainer member 3 includes an axially intermediate portion as a stopper portion 31; a pair of arm portions 33, 33 which extend axially outwardly from one axial end of the stopper portion 31; and a pair of extending portions 35, 35 which extend axially outwardly from the other end of the stopper portion 31 in a direction opposite to the direction in which the two arm portions 33 project from the stopper portion 31. The stopper portion 31 includes two engageable projections 32, 32 which project radially outwardly from an outer surface of one axial end portion of the stopper portion 31. The two extending portions 35, 35 have respective engageable recesses 36, 36.

More specifically described, the stopper portion 31 includes a pair of generally arcuate, tapered wall portions 31b, 31b which are opposed to each other so as to be symmetrically spaced from each other with respect to an axis of the retainer member 3, and each of which is tapered such that the radius of curvature thereof decreases in an axial direction from the side of the arm portions 33 toward the side of the extending portions 35. The two engageable projections 32, 32 project from the two tapered wall portions 31b, 31b, respectively. The stopper portion 31 additionally includes a connection portion 31c which connects between respective one circumferential ends of the two tapered wall portions 31b, 31b so that the stopper portion 31 has the generally C-shaped cross section. The stopper portion 31 further includes a pair of side wall portions 31d, 31d which extend from the respective other circumferential ends of the two tapered wall portions 31b, 31b, which are spacedly opposed to each other, and which have respective end surfaces 31h, 31h. Each of the side wall portions 31d has a generally triangular cross section.

The connection portion 31c includes an arcuate wall portion 31f which extends in the axial direction of the retainer member 3 and which has an arcuate end surface 31a. The arcuate end surface 31a of the arcuate wall portion 31f cooperates with the respective triangular end surfaces 31h, 31f of the two side wall portions 31d, 31d that are connected to the arcuate wall portion 31f via the two tapered wall portions 31b, 31b, to define a generally C-shaped, large-diameter axial end surface 31a, 31h, 31h of the stopper portion 31. The two tapered wall portions 31b, 31b have respective arcuate end surfaces 31e, 31e which are axially opposite to the end surfaces 31a, 31h, 31h and which cooperates with each other to define a circle whose diameter is smaller than that of the circle defined by the end surfaces 31a, 31h, 31h. The connection portion 31c additionally includes two wall portions 31g, 31g between the opposite ends of the arcuate wall portion 31f and the two tapered wall portions 31b, 31b, respectively.

The two side wall portions 31d, 31d which are spacedly opposed to each other are so formed as to have respective triangular cross sections which define respective side surfaces 31i, 31i which are opposed to each other and extend parallel to each other in the axial direction of the retainer member 3. The respective side surfaces 31i, 31i of the two side wall portions 31d, 31d, and an outer circumferential surface of the arcuate wall portion 31f that extends in the axial direction of the retainer member 3 internally contact a common circle. The axial hole 23c of the female member 2 has a dimension slightly greater than the diameter of the common circle. Therefore, in the state in which the retainer member 3 is held by the female member 2, the stopper portion 31 is held by the axial hole 23c such that the stopper portion 31 can be slightly expanded radially outwardly, can be held substantially concentric with the axial hole 23c, and can be prevented from being inclined relative to the axial hole 23c.

The two arm portions 33, 33 which extend axially outwardly from one axial end of the stopper portion 31, include respective extending portions 33a, 33a which axially extend from the two arcuate tapered wall portions 31b, 31b of the stopper portion 31, over the C-shaped large-diameter end surface 31a, 31h of the stopper portion 31; and respective projecting portions 33b, 33b which project radially outwardly from respective end portions of the two extending portions 33a. In the state in which the retainer member 3 is held in the axial hole 23c of the female member 2, the respective projecting portions 33b of the two arm portions 33 are located axially outwardly of the inlet 21d of the female member 2, with respective small spaces being left between the two projecting portions 33b and the inlet 21d.

The two arcuate extending portions 35, 35 which project from the other axial end of the stopper portion 31, which extend in the axial direction of the retainer member 3 and which are opposed to each other, include the respective engageable recesses 36, 36 which are engageable with respective circumferential portions of the annular projection 10 of the end portion 11 of the male member 1 so as to position the male member 1 in the axial direction of the female member 2. In the present embodiment, each of the engageable recesses 36, 36 is provided by a hole which is formed through the thickness of the tubular wall of the retainer member 3. However, each recess 26 may be provided by a groove formed in the tubular wall of the retainer member 3.

Each of the two engageable holes 36, 36 is defined by an inner engageable surface 36a of an engageable portion 34 that is spacedly opposed to a corresponding one of the respective arcuate end surfaces 31e, 31e of the two arcuate tapered wall portions 31b, 31b. Each engageable surface 36a extends in a circumferential direction of the generally C-shaped retainer member 3. Therefore, in the state in which respective circumferential portions of the annular projection 10 of the male member 1 are fitted in the two engageable holes 36, 36 of the retainer member 3, the male member 1 is held by the retainer member 3 such that the male member 1 cannot be moved in the axial direction of the retainer member 3.

The two engageable projections 32, 32 which project radially outwardly from the outer circumferential surface of one axial end portion of the stopper portion 31 are moved toward each other when the retainer member 3 is forcedly fitted in the axial hole 23c of the female member 2 through the inlet 21d and accordingly the stopper portion 31 is elastically deformed or compressed. Thus, the engageable projections 32, 32 are allowed to pass through the inlet 21d. Then, the engageable projections 32, 32 are elastically returned, i.e., radially expanded so as to snap in the two rectangular holes 24, 24 of the female member 2, respectively. Thus, respective second engageable surfaces of the two engageable portions 32, 32 are engaged with the respective first engageable surfaces 25, 25 of the two rectangular holes 24, 24. Therefore, the retainer member 3 is held in the axial hole 23c, while being prevented from disassembling from the female member 2.

An operator can pinch, between his or her fingers, the respective projections 33b, 33b of the two arm portions 33, 33, and thereby compress the stopper portion 31, so that the two engageable projections 32, 32 of the retainer member 3 can snap in the rectangular holes 24, 24 opening in the axial hole 23c. Thus, the retainer member 3 can be held, in advance, in the female member 2, before the male member 1 is held by the retainer member 3. However, alternatively, respective circumferential portions of the annular projection 10 of the male member 1 may first be fitted in the two engageable holes 36, 36 of the retainer member 3, so that the retainer member 3 may be held by the male member 1 such that the retainer member 3 cannot be moved relative to the male member 1 in its axial direction. Then, the male member 1 holding the retainer member 3 may be forcedly inserted into the axial hole 23c of the female member 2 through the inlet 21d, so that the retainer member 3 may be held in the axial hole 23c and simultaneously the male member 1 is connected to the female member 2.

The distance between respective circumferential ends of the two extending portions 35, 35, and the distance between respective circumferential ends of the stopper portion 31, each corresponding to a side opening of the generally C-shaped retainer member 3, is slightly smaller than the outer diameter of the first and third axial portions 11a, 11c of the end portion 11 of the male member 1. Thus, the retainer member 3 held by the male member 1 is prevented from being inclined relative to the male member 1.

The respective inner diameters (i.e., respective radii of curvatures) of the two arcuate end surfaces 31e, 31e of the stopper portion 31 are substantially the same as the outer diameter of the third axial portion 11c of the male member 1. In the case where the retainer member 3 is held in advance in the female member 2, the operator can forcibly push the end portion 11 of the male member 1 into the axial bore 23 of the female member 2 through the inlet 21d, while an inner side surface 10b of the annular projection 10 pushes respective inner surfaces of the two arcuate tapered wall portions 31b, 31b of the stopper portion 31 of the retainer member 3. Consequently respective small-diameter portions of the two tapered wall portions 31b, 31b are elastically deformed or expanded to allow the entire annular projection 10 to pass through the stopper portion 31 and allow respective circumferential portions of the annular projection 10 to snap in the two engageable holes 36, 36. Thus, an outer side surface 10a of the annular projection 10 is engaged with the respective end surfaces 31e, 31e of the tapered wall portions 31b, 31b, respectively. That is, the annular projection 10 cooperates with the retainer member 3 to connect the male member 1 to the female member 2.

Since in the present embodiment each of the respective engageable recesses 36, 36 of the two extending portions 35, 35 of the retainer member 3 is provided by a hole formed through the thickness of the tubular wall of the retainer member 3, an outer circumferential surface 10c of the annular projection 10 fitted in each engageable hole 36 is exposed to a corresponding one of the two rectangular holes 24, 24 of the female member 2, in the state in which the male member 1 is connected to the female member 2. Thus, the operator can observe and judge whether the annular projection 10 of the male member 1 has been fitted in the engageable holes 36, 36 of the retainer member 3.

The operator can pinch, between his or fingers, the stopper portion 31 of the retainer member 3 and thereby elastically deform the same 31 in a direction in which the two side wall portions 31d, 31d are moved toward each other. Thus, the stopper portion 31 is allowed to be inserted into the axial hole 23c of the female member 2 through the inlet 21d, and then is elastically returned or expanded to its original dimension so that the two engageable portions 32, 32 of the retainer member 3 are engaged with the first engageable surfaces 25, 25 of the female member 2. In this state, the large-diameter end surface 31a, 31h of the stopper portion 31, the outer circumferential surface of the arcuate wall portion 31f, and the two parallel side surfaces 31i, 31i are held in the vicinity of an inner surface of the tubular body 20 that defines the axial hole 23c.

Next, there will be described the manner in which the male member 1 is connected to the female member 2, and the manner in which the present quickly connector assembly is used.

First, as described above, in the state in which the retainer member 3 is held in the axial hole 23c of the female member 2, the end portion 11 of the male member 1 is inserted into the axial bore 23 of the female member 2 through the inlet 21d, while the annular projection 10 of the end portion 11 is caused to push the respective inner surfaces of the arcuate tapered wall portions 31b, 31b of the stopper portion 31 of the retainer member 3. More specifically described, the respective small-diameter portions of the two tapered wall portions 31b, 31b are elastically deformed or expanded in the axial hole 23c, and the C-shaped, large-diameter end surface 31a, 31h of the stopper portion 31, the outer circumferential surface of the arcuate wall portion 31f, and the respective parallel side surfaces 31i, 31i of the two side wall portions 31d, 31d are held along the inner surface of the tubular member 20 that defines the axial hole 23c. Thus, the retainer member 3 is kept concentric with the axial hole 23c of the female member 2, so that the first axial portion 11a of the male member 1 can be inserted in, and connected to, the first axial bore 23a of the female member 2, and the outer circumferential surface of the first axial portion 11a is fluid-tightly engaged with respective inner portions of the two annular seal members 6, 8 held in the second axial bore 23b.

In addition, since the respective projections 33b of the two arm portions 33 of the retainer member 3 are engaged with the inlet 21d of the female member 2, the retainer member 3 is prevented from being further moved into the bore 23 of the male member 2. Therefore, when the two arcuate tapered wall portions 31b, 31b of the retainer member 3 are elastically deformed by the annular projection 10 of the male member 1, the retainer member 3 is prevented from being inclined relative to the female member 2, or being moved out of position relative to the same 2. Therefore, the operator can very easily insert the male member 1 into the female member 2.

When the male member 1 is further inserted into the female member 2, the annular projection 10 of the male member 1 passes through the stopper portion 31 of the retainer member 3, and then the stopper member 31 being expanded is elastically returned to its initial shape, so that the annular projection 10 of the male member 1 snaps in the engageable holes 36, 36 of the retainer member 3. More specifically described, the outer side surface 10a of the annular projection 10 of the male member 1 is engaged with the respective end surfaces 31e of the stopper portion 31 of the retainer member. Thus, the male member 1 is prevented from naturally disassembling from the female member 2, before the operator intentionally removes the male member 1 from the female member 2.

In the previously-described alternative manner, the male member 1 which has been fitted in advance in the retainer member 3 may be pushed or inserted into the axial hole 23c of the female member 2 through the inlet 21d, so that the retainer member 3 may be held in the axial hole 23c and simultaneously the male member 1 is connected to the female member 2.

As is apparent from the foregoing description, the male member 1 is connected to the female member 2, by inserting the end portion 11 of the male member 1 through the inlet 21d of the female member 2. Even if the male member 1 may be considerably loosely inserted into the female member 2, the stopper portion 31 of the retainer member 3 that is elastically deformable can be considerably freely deformed to allow the insertion of the male member 1. In addition, since some play is provided between the male member 1 and the female member 2, the male member 1 may be inserted into the female member 2 such that the axis of the male member 1 is misaligned with, or inclined relative to, the axis of the female member 2. However, the female member 2 has the annular recess 27 which is defined by (a) the tapered annular surface 26 whose diameter decreases in an axial direction from the first axial bore 23*a* toward the second axial bore 23*b*, and (b) the cylindrical surface continuous with the inner cylindrical surface of the tubular body 20 that defines the second axial bore 23*b*. The annular recess 27 is recessed from the second axial bore 23*b* in the axial direction of the female member 2, and is located radially outwardly of the first axial bore 23*a*. Therefore, even if the annular seal member 6 may be locally pushed by the free end portion of the male member 1, the pushed portion can be received by the annular recess 27, so that the annular seal member 6 can be prevented from being moved into the first axial bore 23*a*.

Figure 2B:
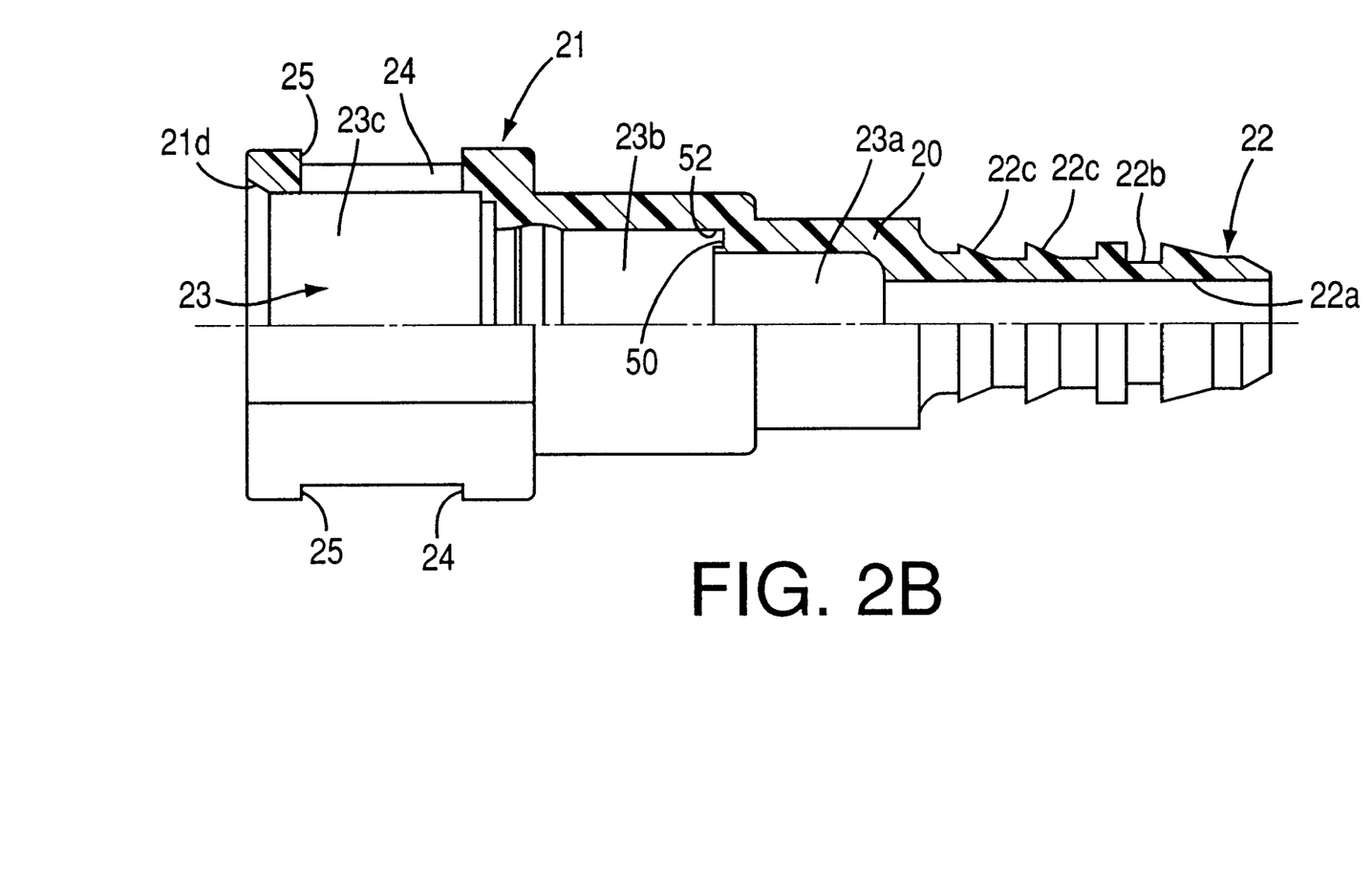
FIG. 2B is a partly cross-sectioned, front elevation view corresponding to FIG. 2A, showing a modified female member of the connector assembly of FIG. 1.

FIG. 2B shows a modified form of the female member 2 shown in FIG. 2A. The female member shown in FIG. 2B has an annular groove 52 having an annular bottom surface 50 at a predetermined depth, in place of the annular recess 27 of the female member 2 that is partly defined by the tapered annular surface 26. The annular groove 52 is a sort of annular recess which opens in the second axial bore 23*b* and prevents the annular seal members 6, 8 from being moved into the first axial bore 23*a* when the end portion 11 of the male member 1 is inserted into the female member 2.

Figure 5:
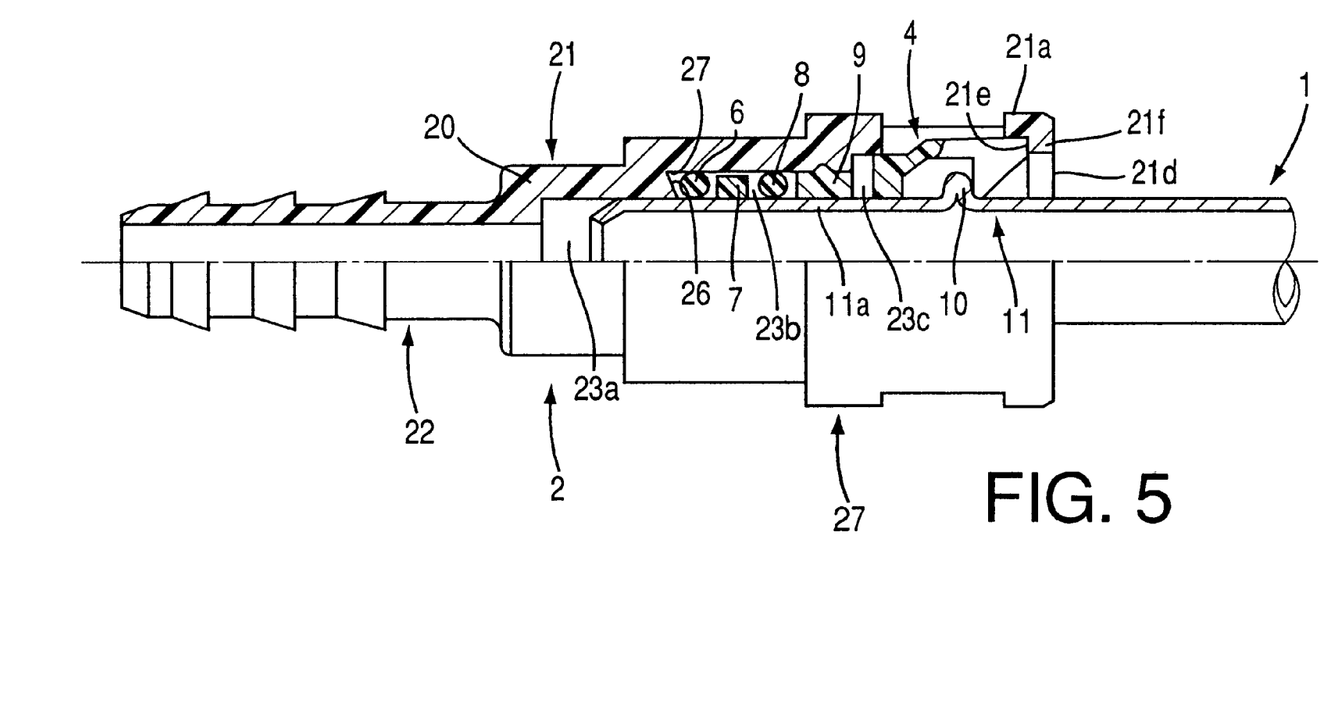
FIG. 5 is a partly cross-sectioned, front elevation view corresponding to FIG. 1, showing another quick connector assembly as a second embodiment of the present invention.
Figure 6:
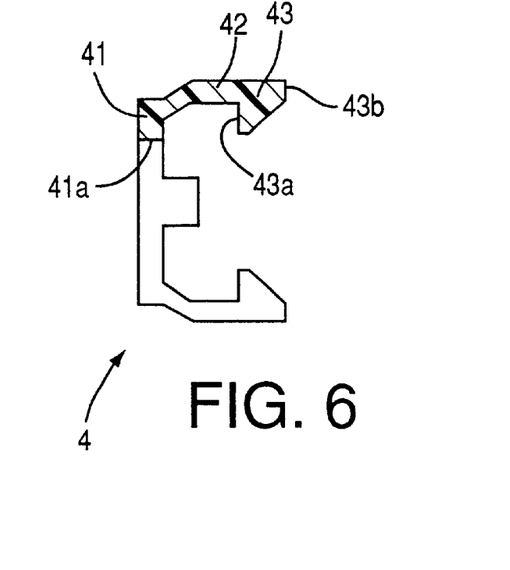
FIG. 6 is a partly cross-sectioned, front elevation view of a retainer member of the connector assembly of FIG. 5.

FIGS. 5 and 6 shows a second embodiment of the present invention that also relates to a quick connector assembly. The quick connector assembly shown in FIGS. 5 and 6 has an inner annular surface 21*e* of a female member 2 and a retainer member 4, in place of the first engageable surfaces 25 and the retainer member 3 of each of the two quick connector assemblies shown in FIGS. 1 to 4. The same reference numerals as used for the connector shown in FIGS. 1 to 4 are used to designate the corresponding elements and parts of the connector shown in FIGS. 5 and 6, and the description thereof is omitted.

The quick connector assembly shown in FIGS. 5 and 6 includes a tubular male member 1, a tubular female member 2, and a retainer member 4 which can be held by the female member 2 and which can hold the male member 1 inserted in the female member 2 so as to connect the male member 1 to the female member 2.

The retainer member 4 includes, as one axial end portion thereof, a collar portion 41 having an inner hole 41*a* having a diameter slightly greater than an outer diameter of an end portion 11 of the male member 1. The retainer member 4 additionally includes a plurality (e.g., three) of elastically deformable arm portions 42 which extend from a radially outer portion of the collar portion 41 in an axial direction of the retainer member 4. The arm portions 42 have respective engageable projections 43 as stopper portions which project radially inwardly from respective free end portions of the arm portions 42.

Like the female member 2 of the connector shown in FIGS. 1 to 4, the female member 2 of the present connector is provided by a single tubular body 20 which has, in one half portion 21 thereof, an axial bore 23 which is suitable for receiving the end portion 11 of the male member 1, and which has, in the other half portion 22, a connection passage connected to a fluid passage of a hose as one of two pipes of a piping system. The end portion 11 including an annular projection 10 is inserted into the female member 2 through an inlet 21*d*, so that the male member 1 is fluid-tightly connected to the female member 2.

More specifically described, the axial bore 23 is concentric with the first half portion 21 of the tubular body 20. The axial bore 23 includes a first axial portion 23*a* which is in communication with the connection passage 22*a* of the other half portion 22 and which is suitable for receiving the end portion 11 of the male member 1; a second axial portion 23*b* which has a diameter greater than that of the first axial portion 23*a* and which holds respective outer portions of two annular seal members 6, 8 which fluid tightly seal between the female member 2 and the male member 1 inserted in the female member 2; and an axial hole 23*c* which has a dimension greater than the diameter of the second axial portion 23*b*.

The tubular body 20 has a free axial end 21*a* from which an inner annular flange 21*f* extends radially inwardly. The inner annular flange 21*f* has an axially inner annular surface 21*e* which is engageable with respective engageable surfaces 43*b* of the engageable projections 43 of the retainer member 4 held in the axial hole 23*c*. The axial hole 23*c* cooperates with the retainer member 4 held therein, to connect stably the female member 2 to the male member 1 inserted therein and prevent the male member 1 from disassembling from the female member 2. An operator can pinch, between his or her fingers, the arm portions 42 and thereby elastically deform the same 42 so as to move the engageable portions 43 toward one another. Thus, the retainer member 4 is allowed to be inserted into the axial bore 23*c*. Then, the arm portions 42 are elastically returned or expanded so that the respective engageable surfaces 43*b* of the engageable portions 43 are engaged with respective portions of the inner annular surface 21*e* of the inner annular flange 21*f* of the female member 2. Thug, the retainer member 4 is held in the axial hole 23*c*.

In the state in which the retainer member 4 is held in advance in the axial hole 23*c* of the female member 2, the end portion 11 of the male member 1 is inserted into the female member 2 through the inlet 21*d*. The annular projection 10 of the end portion 11 elastically deforms or expands the engageable portions 43 of the retainer member 4 and thereby is allowed to snap in an annular groove 43*a* defined by the engageable portions 43. More specifically described, an outer side surface 10*a* of the annular projection 10 is engaged with respective inner surfaces of the engageable projections 43, so that the male member 1 is prevented from disassembling from the female member 2.

In the quick connector assembly shown in FIGS. 5 and 6, too, the tubular body 20 has an annular recess 27 which is defined by a tapered annular recess 26 and a cylindrical surface continuous with an inner cylindrical wall surface of the tubular body 20 that defines the second axial bore 23*b*. The annular recess 27 can prevent the annular seal members 6, 8 from being moved into the first axial bore 23*a* when the end portion 11 of the male member 1 is inserted into the female member 2. The annular groove 27 may be replaced by an annular groove 52, as shown in FIG. 2B, which has an annular bottom surface 50 and has a predetermined depth.

As is apparent from the foregoing description, the principle of the present invention may be employed in various sorts of quick connector assemblies including various sorts of retainer members. For example, the present invention may be applied to the prior quick connector assemblies disclosed in the previously-identified U.S., French, and Japanese patent documents.

It is to be understood that the present invention may be embodied with other changes, improvements, and modifications that may occur to one skilled in the art without departing from the scope and spirit of the invention defined in the appended claims.

What is claimed is:

1. A female member for use with a male member of a quick connector assembly, comprising:

a first tubular portion which has a first axial bore having a first diameter;

a second tubular portion which is coaxial with the first tubular portion and which has a second axial bore which has a second diameter greater than the first diameter of the first axial bore, which is adapted to hold at least one annular seal member and which cooperates with the first axial bore to receive an end portion of the male member; and a connecting portion which connects between the first and second tubular portions and which has an annular recess which opens in the second axial bore and an annular projection which is located radially inwardly of the annular recess the annular recess and the annular projection being located radially outwardly of the first axial bore and cooperating with each other to prevent the annular seal member from being moved from the second axial bore into the first axial bore when the end portion of the male member is inserted from the second axial bore of the female member into the first axial bore thereof.

2. A female member according to claim 1, wherein the connecting portion has (a) a tapered annular surface whose diameter decreases in an axial direction from the first axial bore toward the second axial bore, whose smallest diameter is not smaller than the first diameter of the first axial bore, and whose greatest diameter is not greater than the second diameter of the second axial bore, and (b) a first cylindrical surface which is continuous, in said axial direction, with a second cylindrical surface of the second tubular portion that defines the second axial bore, and wherein the annular recess is at least partly defined by the tapered annular surface and the first cylindrical surface.

3. A female member according to claim 1, wherein the annular recess comprises an annular groove which has a predetermined depth, whose inner diameter is greater than the first diameter of the first axial bore, and whose outer diameter is not greater than the second diameter of the second axial bore.

4. A female member according to claim 1, further comprising a third tubular portion which is coaxial with the first and second tubular portions and which has an axial hole which has a dimension greater than the second diameter of the second axial bore, which is adapted to hold a retainer member and which cooperates with the first and second axial bores to receive the end portion of the male member and cooperates with the retainer member to prevent the male member from disassembling from the female member.

5. A female member according to claim 4, comprising a single tubular member which is integrally formed to include the first, second and third tubular portions and the connecting portion, wherein the first axial bore of the first tubular portion is connected to a fluid passage through which a fluid flows.

6. A female member according to claim 4, wherein the third tubular portion has at least one engageable surface which extends in a radial direction with respect to a common axis of the first, second and third tubular portions and which is engageable with the retainer member to prevent the retainer member from disassembling from the female member.

7. A female member according to claim 6, wherein the third tubular portion has two holes which are opposite to each other with respect to the common axis and each of which is formed through a thickness of the third tubular portion in said radial direction, the third tubular portion having, as said at least one engageable surface, two engageable surfaces which partly define the two holes, respectively.

8. A female member according to claim 6, wherein the third tubular portion has a radially inner annular flange which extends radially inwardly from an axial end of the third tubular portion that defines an inlet through which the end portion of the male member is inserted into the female member, said at least one engageable surface comprising at least one portion of an axially inner annular surface of the radially inner annular flange.

9. A female member according to claim 1, further comprising an annular bushing which is provided in the second axial bore, which cooperates with the annular recess to hold the annular seal member and which stops, at a predetermined position, the insertion of the male member into the female member.

10. A female member according to claim 1, further comprising two annular seal members which are provided side by side in the second axial bore.

11. A quick connector assembly for connecting between two pipes of a piping system, comprising:

a female member;

a retainer member;

a male member having a tubular shape and including an end portion which is insertable into, and is disassembleable from, the female member and which includes a first axial portion which has a free axial end of the male member and has a first outer diameter, a second axial portion which is coaxial with the first axial portion, has a second outer diameter greater than the first outer diameter, and is engageable with the retainer member, and a third axial portion which is coaxial with the first and second axial portions and has a third outer diameter smaller than the second outer diameter; and at least one annular seal member which is engageable with the first axial portion of the end portion of the male member to seal fluid-tightly between the end portion of the male member and the female member, the female member including a first tubular portion which has a first axial bore having a fourth diameter; a second tubular portion which is coaxial with the first tubular portion and which has a second axial bore which has a fifth diameter greater than the fourth diameter of the first axial bore, which is adapted to hold the annular seal member and which cooperates with the first axial bore to receive the end portion of the male member; and a connecting portion which connects between the first and second tubular portions and which has an annular recess which opens in the second axial bore and an annular projection which is located radially inwardly of the annular recess, the annular recess and the annular projection being located radially outwardly of the first axial bore and cooperating with each other to prevent the annular seal member from being moved from the second axial bore into the first axial bore when the end portion of the male member is inserted from the second axial bore of the female member into the first axial bore thereof.

12. An assembly according to claim 11, wherein the connecting portion of the female member has (a) a tapered annular surface whose diameter decreases in an axial direction from the first axial bore toward the second axial bore, whose smallest diameter is not smaller than the first diameter of the first axial bore, and whose greatest diameter is not greater than the second diameter of the second axial bore, and (b) a first cylindrical surface which is continuous, in said axial direction, with a second cylindrical surface of the second tubular portion that defines the second axial bore, and wherein the annular recess is at least partly defined by the tapered annular surface and the first cylindrical surface.

13. An assembly according to claim 11, wherein the annular recess of the female member comprises an annular groove which has a predetermined depth, whose inner diameter is greater than the first diameter of the first axial bore, and whose outer diameter is not greater than the second diameter of the second axial bore.

14. A female member according to claim 11, wherein the female member further comprises a third tubular portion which is coaxial with the first and second tubular portions and which has an axial hole which has a dimension greater than the fifth diameter of the second axial bore, which is adapted to hold the retainer member and which cooperates with the first and second axial bores to receive the end portion of the male member and cooperates with the retainer member to prevent the male member from disassembling from the female member.

15. An assembly according to claim 14, wherein the third tubular portion has at least one first engageable surface which extends in a radial direction with respect to a common axis of the first, second, and third tubular portions and which is engageable with the retainer member to prevent the retainer member from disassembling from the female member.

16. An assembly according to claim 15, wherein the retainer member has a central space into which the end portion of the male member is insertable; at least one elastically deformable portion which has at least one engageable recess and which is elastically deformable to allow at least one portion of the second axial portion of the end portion to snap in said at least one engageable recess so that the male member is held by the retainer member; and at least one second engageable surface which is engageable with said at least one first engageable surface of the third tubular portion of the female member so that the retainer member is held by the female member.

17. An assembly according to claim 15, wherein the third tubular portion of the female member has two holes which are opposite to each other with respect to the common axis and each of which is formed through a thickness of the third tubular portion in said radial direction, the third tubular portion having, as said at least one first engageable surface, two first engageable surfaces which define the two holes, respectively.

18. An assembly according to claim 11, wherein the first axial bore of the female member is connected to a fluid passage of one of the two pipes through which a fluid flows.

19. An assembly according to claim 11, further comprising an annular bushing which is provided in the second axial bore and which cooperates with the annular recess to hold the annular seal member.

20. An assembly according to claim 11, wherein the retainer member has at least one engageable recess which is engageable with at least one portion of the second axial portion of the end portion of the male member to hold the male member.

21. An assembly according to claim 20, wherein said at least one engageable recess comprises at least one selected from at least one hole and at least one groove.

* * * * *